A. J. TOWER.
CULTIVATOR ATTACHMENT.
APPLICATION FILED NOV. 18, 1918.
1,304,631. Patented May 27, 1919.
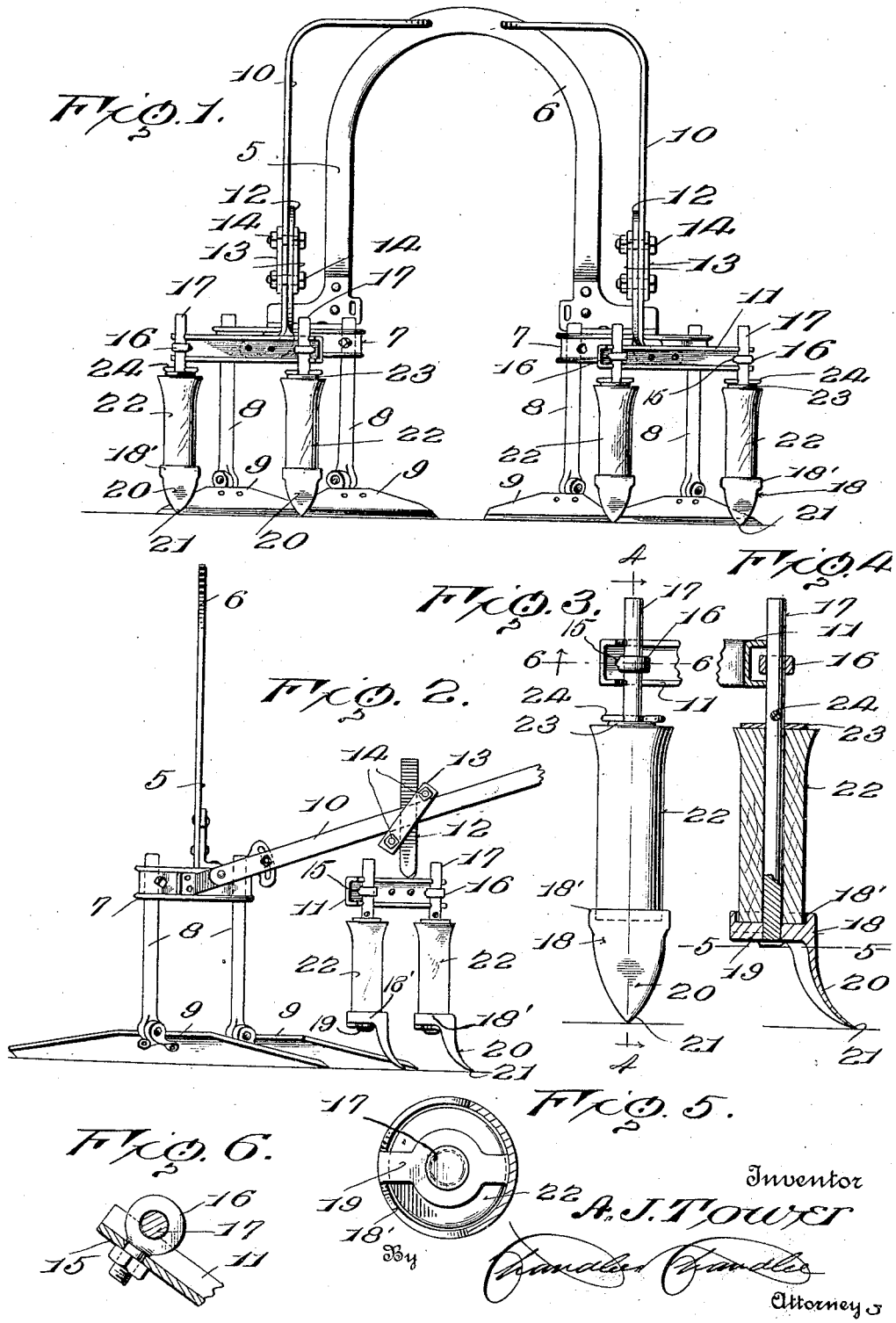

UNITED STATES PATENT OFFICE.

ANDREW J. TOWER, OF MENDOTA, ILLINOIS.

CULTIVATOR ATTACHMENT.

1,304,631. Specification of Letters Patent. Patented May 27, 1919.

Application filed November 18, 1918. Serial No. 263,042.

*To all whom it may concern:*

Be it known that I, ANDREW J. TOWER, a citizen of the United States, residing at Mendota, in the county of La Salle, State of Illinois, have invented certain new and useful Improvements in Cultivator Attachments; and I do hereby declare the following to be a full, clear, and exact description of the invention, such as will enable others skilled in the art to which it appertains to make and use the same.

This invention relates to cultivators and more particularly to attachments therefor, and has for its object to provide a device which may be adjustably attached to a cultivator and which will deflect morning glory and similar trailing vines and trash from the blades or shovels supporting shanks of the cultivator so as to prevent accumulation of such vines and trash upon the shanks.

Another object is to provide such an attachment including rollers to receive vines thereagainst, together with means for directing vines to the rollers and means for preventing vines from wedging between the rollers and their supporting portions.

Other objects will be seen from the following description.

In the drawings:

Figure 1 is a front elevation of a cultivator to which the present invention is attached.

Fig. 2 is a side elevation showing one side portion of a cultivator and the attachment carried thereby.

Fig. 3 is an enlarged front elevation of one of the rollers and adjacent parts.

Fig. 4 is a vertical section through one of the rollers and the cross arm, on line 4—4 of Fig. 3.

Fig. 5 is a detail section through the lower end of Fig. 4 on line 5—5 thereof.

Fig. 6 is a detail section on line 6—6 of Fig. 3.

Referring now to the drawings, there is shown a cultivator which includes spaced cross heads 7 connected by a yoke 6. Each cross head 7, carries depending shanks 8 to which the scraper blades 9 are attached. Draw bars 10 are adjustably connected with the heads, and are inclined upwardly and forwardly therefrom, as shown. These bars 10 are to be attached at their forward end to a draft beam (not shown).

In connection with the type of cultivator illustrated, two of the present attachments are employed, one for each side portion. Each attachment includes a cross head 11 formed of channel iron, to which there is attached an upwardly extending bar 12. This bar 12 serves as an attaching element, and is disposed against a draw bar of the cultivator and is held thereto by clamping plates, indicated at 13, one of which is disposed against the bar 12, while the other is disposed against the draw bar 10, bolts 14 being engaged through the plates and provided with nuts operable to clamp the plates against the parts which they engage, thus holding the bar 12 securely to the draw bar. It will be understood, of course, that these bolts may be loosened to permit of vertical adjustment of the attachment.

Adjacent to the ends of the cross head 11, the head is provided with openings 15, through which are engaged eye bolts 16 lying partially within the channel of the cross arm. Downwardly extending shafts 17 are engaged at their upper ends in these eyes, and the bolts 16 are provided with nuts operating against the opposite face of the cross arm from its channel, so that the bolts may be drawn through the cross arm to clamp the shafts 17 against sliding movement, this structure providing for vertical adjustment of the shafts, as will be understood.

The lower end of each shaft 17 carries a ground engaging point 18 consisting of an annulus 18' provided with a diametrical web 19, which is secured to the shaft 17, with the annulus extending upwardly and surrounding the shaft, and the lower edge of the annulus carries a downwardly extending, outwardly curved finger 20, the sides of which taper downwardly to a pointed tip 21.

Engaged upon each of the shafts 17 there is a revoluble roller 22, having its lower end seated in the annulus of the shaft and supported upon the web 19 thereof. A washer 23 is engaged upon the shaft above the roller, and upward movement of the roller and washer is prevented by a pin 24 engaged through the shaft above the washer.

In use, the shafts 17 are set so that the points or tips 21 of the fingers 20 will engage the ground operated upon by the scraper blades 9 and with these fingers directed forwardly of the cultivator. Thus, as the cultivator is moved over the ground, vines, etc., will be engaged by the fingers and will travel upwardly thereover by reason of the curvature of the fingers, to the rollers 22, when further movement of the cultivator will cause the vines etc. to pass from the rollers and to the rear of the cultivator. Since the rollers are located forwardly of the shanks 8 and approximately in alinement therewith longitudinally of the cultivator, the rollers act to deflect the vines etc. from the shanks.

By reason of the fact that the rollers have their lower ends seated in the annuluses, the latter form guards by which vines are prevented from wedging between the rollers and the webs 19.

What is claimed is:

An attachment for cultivators including a shaft, means for attaching the shaft to a cultivator, a support carried by the shaft, a roller revoluble on the shaft and abutting the support, a guard surrounding the roller and contacting with the support and a vine deflecting finger connected with the guard.

In testimony whereof, I affix my signature, in the presence of two witnesses.

ANDREW J. TOWER.

Witnesses:
B. F. McEvoy,
J. D. Tower, Jr.

Copies of this patent may be obtained for five cents each, by addressing the "Commissioner of Patents, Washington, D. C."